United States Patent
Hamann et al.

(10) Patent No.: US 9,857,235 B2
(45) Date of Patent: Jan. 2, 2018

(54) REAL-TIME MODELING OF HEAT DISTRIBUTIONS

(71) Applicant: International Business Machines Corporation, Armonk, NY (US)

(72) Inventors: Hendrik F. Hamann, Yorktown Heights, NY (US); Hongfei Li, Briarcliff Manor, NY (US); Srinivas Yarlanki, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 13/791,140

(22) Filed: Mar. 8, 2013

(65) Prior Publication Data

US 2014/0257740 A1    Sep. 11, 2014

(51) Int. Cl.
  *G01K 1/02*  (2006.01)
  *G01K 7/42*  (2006.01)
(52) U.S. Cl.
  CPC .............. *G01K 7/42* (2013.01); *G01K 1/02* (2013.01); *G01K 2213/00* (2013.01)
(58) Field of Classification Search
  CPC ......... G01K 1/02; G01K 7/42; G01K 2213/00
  See application file for complete search history.

(56) References Cited

U.S. PATENT DOCUMENTS

| | | | |
|---|---|---|---|
| 7,366,632 B2 | 4/2008 | Hamann et al. | |
| 8,244,502 B2 | 8/2012 | Hamann et al. | |
| 8,306,794 B2 | 11/2012 | Hamann et al. | |
| 2008/0288193 A1 | 11/2008 | Claassen et al. | |
| 2009/0164811 A1 | 6/2009 | Sharma et al. | |
| 2009/0326879 A1 | 12/2009 | Hamann et al. | |
| 2009/0326884 A1 | 12/2009 | Amemiya et al. | |
| 2010/0312498 A1* | 12/2010 | Hamann ............... | G01F 1/6842 702/45 |
| 2011/0040532 A1 | 2/2011 | Hamann et al. | |
| 2011/0060561 A1 | 3/2011 | Lugo et al. | |

OTHER PUBLICATIONS

Joshi et al., "Energy Efficient Thermal Management" 2012, Chapters 1, 2, 3, Springer.*
Webster et al., "Modeling of Underfloor Air Distribution (UFAD) Systems", 2008, 3rd Natl. Conf. of IBPSA pp. 214-221.*
Sarkar et al., "CFD Modeling and Validation of Temperature and Flow Distribution in Air-Conditioned Space", 2008, International Refrigeration and Air Conditioning Conference. Paper 972.*
Joshi et al., "Energy Efficient Thermal Management" 2012, Chapters 1 & 11, Springer.*

(Continued)

*Primary Examiner* — Regis Betsch
(74) *Attorney, Agent, or Firm* — Vazken Alexanian; Michael J. Chang, LLC

(57) ABSTRACT

Techniques for real-time modeling temperature distributions based on streaming sensor data are provided. In one aspect, a method for creating a three-dimensional temperature distribution model for a room having a floor and a ceiling is provided. The method includes the following steps. A ceiling temperature distribution in the room is determined. A floor temperature distribution in the room is determined. An interpolation between the ceiling temperature distribution and the floor temperature distribution is used to obtain the three-dimensional temperature distribution model for the room.

23 Claims, 12 Drawing Sheets

(56) References Cited

OTHER PUBLICATIONS

Kumar et al., "Effect of Supply Air Temperature on Rack Cooling in a High Density Raised Floor Data Center Facility", 2011 Proceedings of the ASME 2011 International Mechanical Engineering Congress & Exposition IMECE2011 Nov. 11-17, 2011, Denver, Colorado, USA.*

Energy Efficient Thermal Management of Data Centers 2012, pp. 273-334 Hendrik F. Hamann, Vanessa Lopez, Data Center Metrology and Measurement-Based Modeling Methods.

Hamann et al., "Uncovering energy-efficiency opportunities in data centers," IBM J. Res. & Dev., vol. 53, No. 3, pp. 10:1-10:12, May 2009.

EPA Report to Congress on Server and Data Center Energy Efficiency Public Law 109-431, United States Code, Aug. 2, 2007.

Li et al., "ThermoCast: A Cyber-Physical Forecasting Model for Data Centers," KDD 2011: 17th ACM SIGKDD, Conference on Knowledge Discovery and Data Mining, Aug. 21-24, 2011 San Diego, CA.

Lopez et al., "Measurement-Based Modeling for Data Centers," 12th IEEE Intersociety Conference on Thermal and Thermomechanical Phenomena in Electronic Systems (Itherm), pp. 1-8, Jun. 2-5, 2010.

Tang et al., "Sensor-Based Fast Thermal Evaluation Model for Energy Efficient High-Performance Datacenters," 4th International Conference on Intelligent Sensing and Information Processing—ICISIP 2006 Oct. 15, 2006-Dec. 18, 2006, pp. 203-208.

A. Terzis, "Active Cyber-Thermal Management of Data Centers for Energy Efficiency," Computer Science Department Johns Hopkins University, Hopkins Internetworking Research Group HiNRG, Mar. 17, 2011.

* cited by examiner

Plenum mask array (354, 246) (black=0; white=1)

Raised Floor mask array (354, 246) (black=0; white=1)

Ceiling mask array (354, 246) (black=0; white=1)

Equipment index array (354, 246) (black=0 – no equipment; goes from 1-242 (for 242 pieces of equipment))

Create Table: MS + missing:

| Type | Total | Out of Time | Out of Range | Remaining |
|------|-------|-------------|--------------|-----------|
| Thermal | | | | |
| Pressure | | | | |
| Flow | | | | |

Plenum temperature distribution array (354, 246)

Ceiling temperature distribution array (354, 246)

Ceiling temperature distribution array (354, 246)

Pressure distribution array (354, 246)

Perforated tile flow distribution array (354, 246)

Response function matrix – here (400 x 400 array)

Matrix (354, 246) of $\prod_{q}^{\#oftiles} resp^q(x,y)$ with w=10 (1.67 feet)

Matrix (354, 246) of $\prod_{q}^{\#oftiles} resp^q(x, y)$ with w=5 (0.83 feet)

Floor temperature distribution (354, 246)

Floor temperature distribution (354, 246)

Raised floor temperature distribution (354, 246)

Raised floor temperature distribution (354, 246)
FIG. 17B
FIG. 18
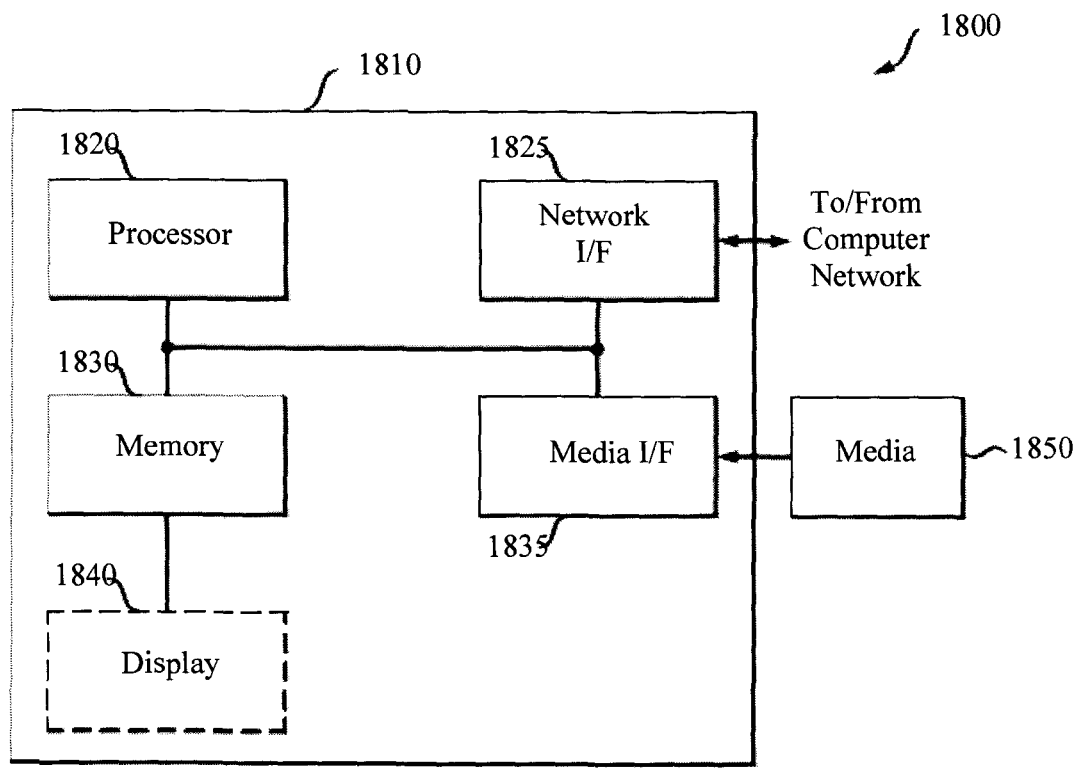

REAL-TIME MODELING OF HEAT DISTRIBUTIONS

STATEMENT OF GOVERNMENT RIGHTS

This invention was made with Government support under Contract number DE-EE00002897 awarded by Department of Energy. The Government has certain rights in this invention.

FIELD OF THE INVENTION

The present invention relates to modeling temperature distributions in an indoor environment, such as a data center, and more particularly, to techniques for real-time modeling temperature distributions based on streaming sensor data.

BACKGROUND OF THE INVENTION

The energy consumption of data centers has dramatically increased in recent years, primarily because of the massive computing demands driven essentially by every sector of the economy, ranging from accelerating online sales in the retail business to banking services in the financial industry. A study estimated the total U.S. DC energy consumption in the year 2005 to be approximately 1.2% of the total U.S. consumption (up by 15% from the year 2000). See, for example, "EPA Report to Congress on Server and Data Center Energy Efficiency" Public Law 109-431, United States Code, Aug. 2, 2007.

In order to improve data center energy efficiency, it is important to be able to accurately assess the temperature distributions with the data center. That way cooling systems can be effectively implemented with greater efficiency. Further, changing conditions within the data center make it desirable to be able to determine the temperature distributions in a timely manner, in order to continually maintain an efficient cooling operation within the data center.

Thus, techniques for real-time modeling temperature distributions would be desirable.

SUMMARY OF THE INVENTION

The present invention provides techniques for real-time modeling temperature distributions based on streaming sensor data. In one aspect of the invention, a method for creating a three-dimensional temperature distribution model for a room having a floor and a ceiling is provided. The method includes the following steps. A ceiling temperature distribution in the room is determined. A floor temperature distribution in the room is determined. An interpolation between the ceiling temperature distribution and the floor temperature distribution is used to obtain the three-dimensional temperature distribution model for the room.

A more complete understanding of the present invention, as well as further features and advantages of the present invention, will be obtained by reference to the following detailed description and drawings.

Figure 15A:
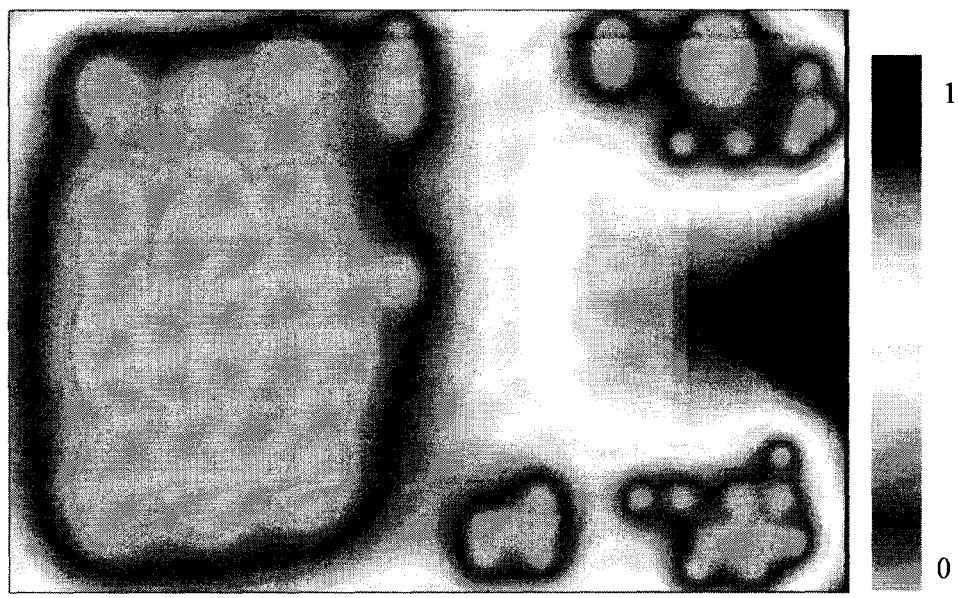
FIG. 15A is a diagram illustrating an exemplary matrix of $$\prod_{q}^{\# oftiles} resp^q(x, y)$$
Figure 15B:
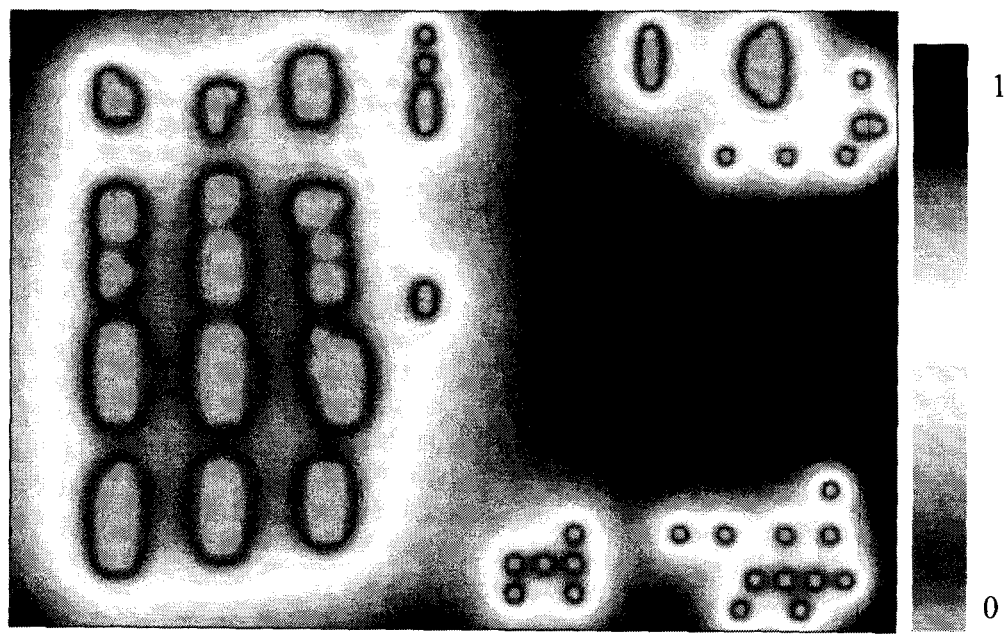
Figure 16A:
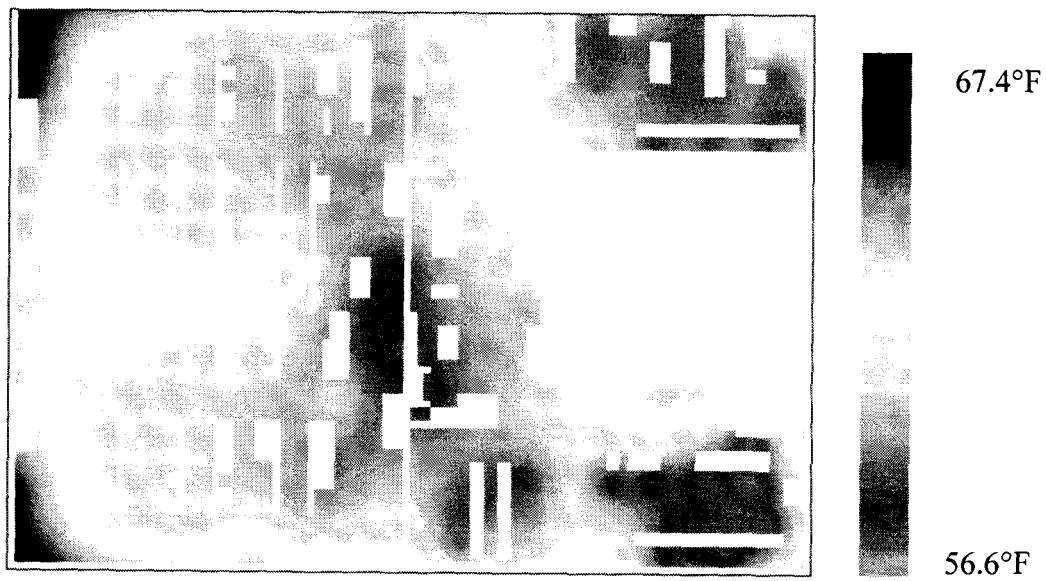
Figure 16B:
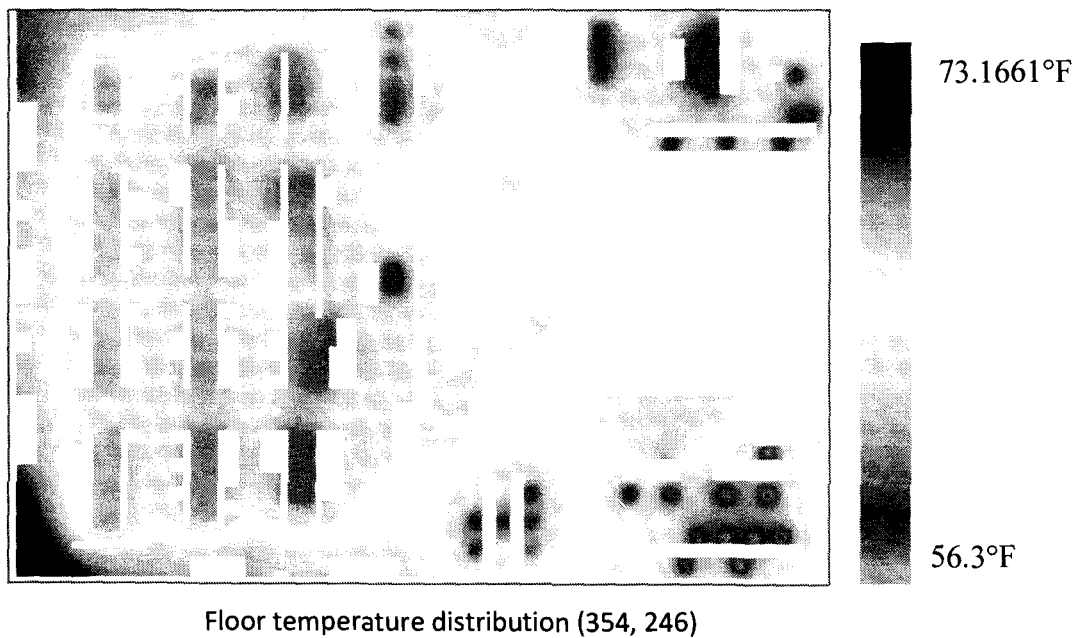
Figure 17A:
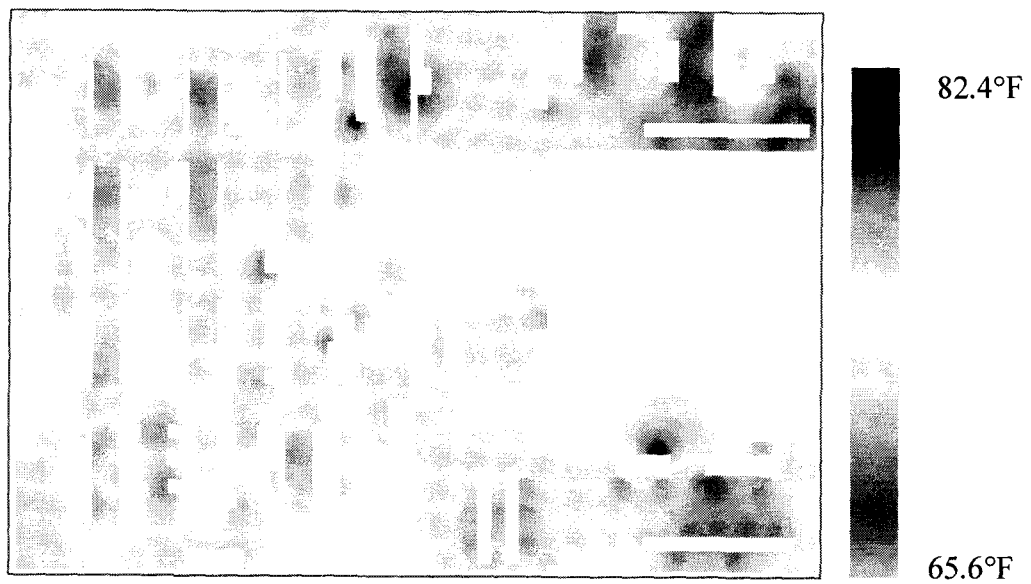

with w=10 (1.67 feet) according to an embodiment of the present invention;

FIG. 15B is a diagram illustrating exemplary matrix of $$\prod_{q}^{\# oftiles} resp^q(x, y)$$

with w=5 (0.83 feet) according to an embodiment of the present invention;

FIG. 16A is a diagram illustrating an exemplary floor temperature distribution with w=10 (1.67 feet) according to an embodiment of the present invention;

FIG. 16B is a diagram illustrating an exemplary floor temperature distribution with w=5 (0.83 feet) according to an embodiment of the present invention;

FIG. 17A is a diagram illustrating an exemplary raised floor temperature distribution at 4.5 feet with $\Delta T_V = 12°$ C. according to an embodiment of the present invention;

FIG. 17B is a diagram illustrating an exemplary raised floor temperature distribution at 4.5 feet with $\Delta T_V = 4°$ C. according to an embodiment of the present invention; and FIG. 18 is a diagram illustrating an exemplary apparatus for creating a three-dimensional temperature distribution model for a room having a floor and a ceiling according to an embodiment of the present invention.

DETAILED DESCRIPTION OF PREFERRED EMBODIMENTS

Provided herein are techniques for real-time modeling temperature distributions based on streaming sensor data. Also described herein is how this method can be benchmarked against "detailed" temperature measurements to improve the model accuracy. It is notable that while the present techniques are described in the context of data center temperature modeling, the fundamental concepts can be applied to any indoor space, including but not limited to buildings, rooms, residential and commercial dwellings, etc. in the same manner as described.

Traditionally, computational fluid dynamics (CFD) methods are used to model such temperature distributions solving a complex system of coupled, partial differential equations (PDEs). Although CFD methods have been successfully deployed to data centers or buildings they come with long computation times. In fact, it is not often clear whether the "quality" of the input data required to specify the boundaries of the PDEs warrants such detailed computation. Because of these large computation times, some other methods have been explored where temperature distributions are simply obtained by "interpolation" from real-time sensor data. Such techniques may involve inverse distance interpolation, kriging methods and/or proper orthogonal decomposition. Although such techniques are much faster than CFD methods they lack the physical insights and accuracy as well as a way to benchmark and improve their accuracy.

Figure 1:
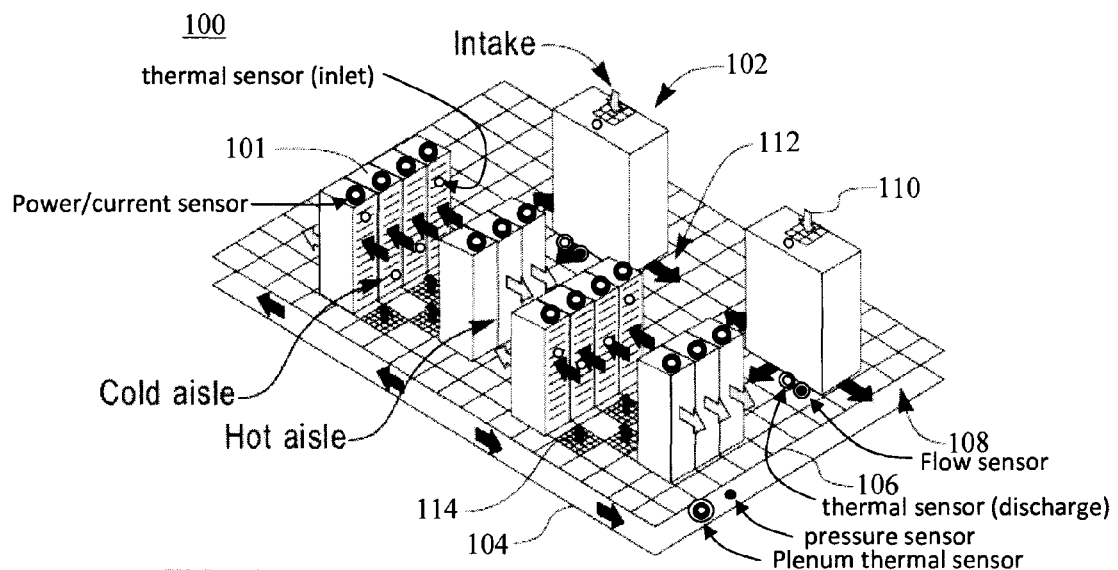
FIG. 1 is a diagram illustrating an exemplary data center according to an embodiment of the present invention.

In a first aspect of the present techniques a much faster method for modeling temperature distributions is described. FIG. 1 is a diagram illustrating exemplary data center 100. Data center 100 has information technology (IT) racks 101 and a raised-floor cooling system with air conditioning units (ACUs) 102 (also referred to herein as computer room air conditioners (CRACs), see below) that take hot air in (typically from above through one or more air returns in the CRACs) and exhaust cooled air into a sub-floor plenum below. The sub-floor plenum may also be referred to herein simply as the "plenum." Hot air flow through data center 100 is indicated by light arrows 110 and cooled air flow through data center 100 is indicated by dark arrows 112.

In FIG. 1, IT racks 101 use front-to-back cooling and are located on raised-floor 106 with sub-floor 104 beneath. Namely, according to this scheme, cooled air is drawn in through a front (inlet) side of each rack and warm air is exhausted out from a rear (outlet) side of each rack. The cooled air drawn into the front of the rack is supplied to air inlets of each IT equipment component (servers for example) therein. Space between raised floor 106 and sub-floor 104 defines the sub-floor plenum 108. The sub-floor plenum 108 serves as a conduit to transport, e.g., cooled air from the ACUs 102 to the racks. In a properly-organized data center (such as data center 100), racks 101 are arranged in a hot aisle—cold aisle configuration, i.e., having air inlets and exhaust outlets in alternating directions. Namely, cooled air is blown through perforated floor tiles 114 in raised-floor 106, from the sub-floor plenum 108 into the cold aisles. The cooled air is then drawn into racks 101, via the air inlets, on an air inlet side of the racks and dumped, via the exhaust outlets, on an exhaust outlet side of the racks and into the hot aisles.

The ACUs typically receive chilled water from a refrigeration chiller plant (not shown), also referred to herein simply as a "chiller." Each ACU typically includes a blower motor to circulate air through the ACU and to blow cooled air, e.g., into the sub-floor plenum. As such, in most data centers, the ACUs are simple heat exchangers mainly consuming power needed to blow the cooled air into the sub-floor plenum. Coolant distribution units (CDUs) (not shown) can be employed at the interface between the chiller and the ACUs. In general, a CDU includes a heat exchanger and one or more circulating pumps to circulate the chilled water through the ACUs. Thus, as will be described in detail below, the CDUs contribute to the overall power consumption in the data center.

Typically, one or more power distribution units (PDUs) (not shown) are present that distribute power to the IT equipment racks 101. As will be described in detail below, power consumption by the PDUs can be an important consideration in the present techniques. In general, since the PDUs supply electrical power required by the IT equipment in a data center, a total electrical power intake of the PDUs represents an important parameter in determining the energy efficiency of a data center. According to an exemplary embodiment, each of the PDUs is outfitted with commercially available power and current sensors which measure the electric power drawn by each of the PDUs.

Uninterruptable power supplies or UPS (not shown) are also typically implemented in a data center to protect the IT equipment in the event of a power disruption so as to prevent data loss (i.e., UPS provides short term power when the power source fails). As is known in the art, the UPSs might also correct common utility power issues, such as voltage spikes.

The pressure differential between the "pressurized" sub-floor plenum and the raised floor is measured with a pressure sensor(s) (see sensor labeled "pressure sensor" in FIG. 1). According to an exemplary embodiment, multiple pressure sensors are employed throughout the plenum. The cold air delivered from the ACUs through the sub-floor plenum cools the servers. Thermal temperature sensors at the inlet (Tin) of the servers monitor the inlet temperatures of the servers in the racks, and in this example are measured using inlet thermal sensors (see sensors labeled "thermal sensors (inlet)" in FIG. 1, which are present at the air inlet sides of the racks). The heated air from the exhaust of the server is then returned to the ACUs, where it is cooled and discharged into the sub-floor plenum. The return (or intake) temperature (TR) to the ACUs, discharge temperature (TD) as well as the air flow of each ACU are monitored. In the example shown in FIG. 1, the return temperature (RT) is measured using inlet thermal sensors, the discharge temperature of each of the ACUs is measured using a discharge thermal sensor (labeled "thermal sensor (discharge)") and the air flow of each of the ACUs is measured using a flow sensor (labeled "flow sensor"). In the example shown in FIG. 1, the electric power drawn by the racks is measured using power and current sensors (labeled "power/current sensor") located at each of the racks. Temperature in the plenum is measured using a plenum thermal sensor (labeled "plenum thermal sensor"). The use of a plenum thermal sensor(s) is optional, since readings of the plenum temperature may be obtained from the thermal sensors (discharge) (see FIG. 1). When equipped with both plenum thermal sensors and thermal sensors (discharge), then the plenum temperature may be determined based on a composite of the readings from all of these thermal sensors. Thermal, air flow, pressure, and power/current sensors are commercially available. These sensors can provide measurement data in real time, which as described below is used in the present modeling techniques.

As is apparent from the description of FIG. 1, a data center is essentially a room (i.e., an indoor environment) having a ceiling and a floor. In the case of exemplary data center 100 which employs raised-floor cooling, a sub-floor plenum is present beneath the floor. Thus in that case, the floor may also be referred to herein as a raised floor (RF). As will be described in detail below, in the present process a modeled ceiling temperature distribution in the data center and a modeled floor temperature distribution are used to determine/model a three-dimensional temperature distribution in the data center (using, e.g., an interpolation process). When reference is made herein to a ceiling temperature distribution it is intended to mean the temperature distribution in a portion of the data center proximate to the ceiling (i.e., rather than the temperature of the ceiling itself). Thus, for instance, the ceiling temperature distribution represents a modeling of temperatures within one foot of the data center ceiling. Similarly, when reference is made herein to a floor (or raised floor (RF)) temperature distribution it is intended to mean the temperature distribution in a portion of the data center proximate to the floor (i.e., rather than the temperature of the floor itself). Thus, for instance, the floor temperature distribution represents a modeling of temperatures within one foot of the data center floor. As described in detail below, a plenum temperature distribution is also modeled. This distribution represents the temperatures within the sub-floor plenum.

In contrast to other techniques, in the present techniques the interpolation solution is bound to obey energy balance. The steps of the present techniques will be described in detail in conjunction with the description of FIG. 3, below. In overview, however, the present techniques serve to first obtain a plenum temperature distribution (calculated by two-dimensional (2D) inverse distance interpolation from real-time thermal data of sensors in the plenum (here discharge thermal sensors)). It is noted that alternatively 2D CFD calculations could instead be used to obtain such plenum temperature distributions. Such two-dimensional (2D) CFD calculations are described, for example, in Energy Efficient Thermal Management of Data Centers 2012, pp 273-334 Hendrik F. Hamann, Vanessa Lopez, Data Center Metrology and Measurement-Based Modeling Methods, the contents of which are incorporated by reference herein. Then, the total power of the data center room is estimated and the mean ceiling temperature is calculated using the total measured air flow produced by the ACUs. As depicted in FIG. 1 each ACU is being monitored with a flow sensor indicating the amount of air flow.

Figure 2:
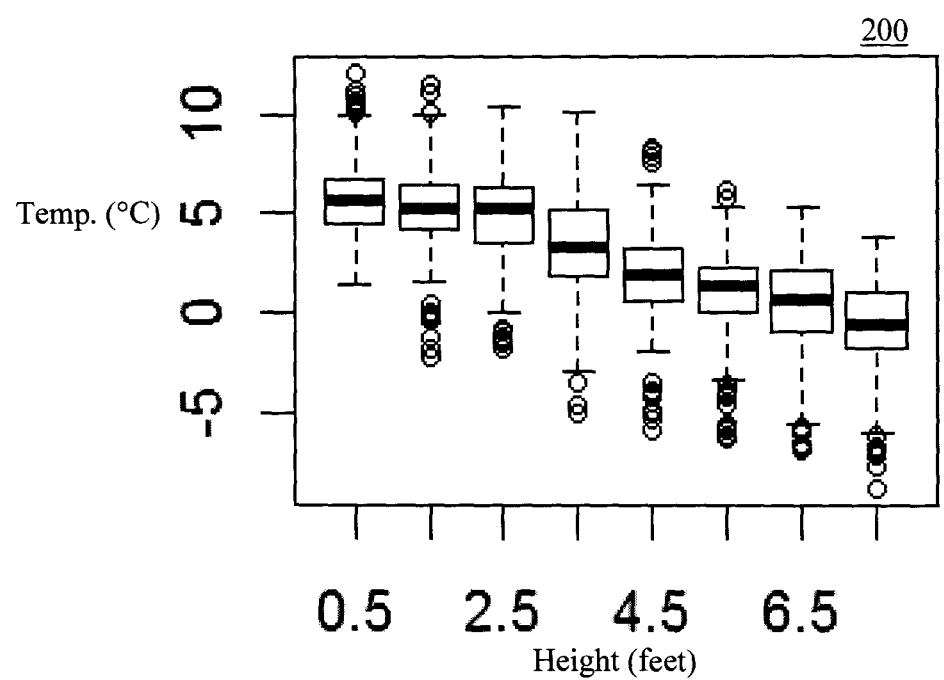
FIG. 2 is a graph illustrating differences of exhaust and inlet temperatures according to an embodiment of the present invention.

While so far only the mean ceiling temperature has been determined, a more detailed ceiling temperature distribution is next calculated by leveraging the inlet thermal sensors distributed at one or more of the inlets of each rack. In order to estimate the exhaust temperatures for each rack, virtual sensors may optionally be placed at the "exhaust" side of the rack opposite to the inlet thermal sensors. With virtual sensors a knowledge base is used to "estimate" the difference between inlet and exhaust temperatures—see FIG. 2. FIG. 2 is a graph 200 illustrating differences of exhaust and inlet temperatures in degree Celsius (° C.) at heights from 0.5 feet to 7.5 feet. The difference can be a function of the height of the sensor in the data center (based, for example, on the placement of the sensor on the rack) and/or equipment type, power consumption, etc.

Using the real and virtual thermal sensors, a 2D inverse distance interpolation is then used to calculate the ceiling temperature distribution. In order to account for the fact that the different sensors are at different heights in the data center (based, for example, on the placement of the sensor on the rack) and thus influence the ceiling temperature to a greater or lesser extent, each sensor is weighted by its distance to the ceiling. The dependence is accomplished with a "damping" factor as described in further detail below. Once the ceiling temperature distribution has been estimated, the mean value of that distribution is adjusted so that it obeys the principle of energy balance as previously established.

Next, the floor temperature distribution is estimated. In order to do so, the air flow through each perforated tile is first calculated using the tile impedance of each tile and the pressure differential at the tile location. The plenum pressure distribution is obtained by 2D inverse distance interpolation of the real-time pressure sensors sensing the pressure differential between the raised floor and the plenum at various locations in the data center. In the example shown in FIG. 1, the pressure sensors are located in the plenum. While there might be pressure sensors in locations in the data center other than in the plenum, it is notable that according to the present techniques data from the plenum pressure sensors is sufficient. Once, the air flow through each perforated tile has been calculated, a Lorentzian field is applied to each tile location. The Lorentzian field is chosen to yield 0 at the center of the tile and converge to 1 at large distances from the tile. The width of the Lorentzian field can be a function of the air flow where larger flows could result in a slower convergence to 1 with distance (wider fields, more impact). This process is repeated by multiplying the Lorentzian fields at each tile location with the previous fields. The process yields a 2D surface with very low values (close to 0) in the vicinity of tiles and higher values (close to 1) at locations far away from the tiles. An average temperature increase distribution in the data center is then calculated, which is given by the difference between ceiling and plenum temperature distributions. This average temperature increase distribution is multiplied by the product of the Lorentzian fields and the plenum temperature distribution is added to it to yield the floor temperature distribution. The process yields floor temperatures very near to the plenum temperature at locations close to tiles and average temperatures at locations far away from tiles.

Finally, from the ceiling and floor temperature distributions, a three dimensional temperature distribution for the data center room can be obtained by interpolating between these values using different approaches. One approach includes using an s-curve. S-curves are described, for example, in U.S. patent application Ser. No. 12/540,213 filed by Hamann et al., entitled "Knowledge-Based Models for Data Centers," the contents of which are incorporated by reference herein. In the instant description, a simple linear interpolation between the floor and the ceiling temperature is employed.

In a second aspect of the present techniques, a method is described for improving the model described in the first aspect above by using detailed temperature distribution measurements from the MMT tool/cart. MMT is a technology for optimizing data center infrastructures for improved energy and space efficiency which involves a combination of advanced metrology techniques for rapid measuring/surveying data centers (see, for example, U.S. Pat. No. 7,366,632, issued to Hamann et al., entitled "Method and Apparatus for Three-Dimensional Measurements," the contents of which are incorporated by reference herein) and physics-based modeling techniques for optimizing a data center facility within a given thermal envelope for optimum space and most-efficient energy utilization (see, for example, U.S. Application Publication Number 2008/0288193 A1, filed by Claassen et al., entitled "Techniques for Analyzing Data Center Energy Utilization Practices," the contents of which are incorporated by reference herein. The MMT cart data can be used to fit parameters as described immediately below. Basically, the goal is to optimize/fine-tune the process by finding the parameters (see below) that give the best fit to the data obtained from the MMT cart.

The parameters to fit include 1) the width of the Lorentzian fields (which can be a function of the perforated air flow), 2) the temperature increase across the rack inlet and exhaust (which can be a function of the height in the data center, equipment type, etc.) and 3) a damping parameter, which determines the weights of the thermal sensors as a function of height. These parameters can be adjusted to minimize the error between the interpolated three dimensional temperature distribution for the data center room and the detailed temperature distribution measurements from the MMT tool/cart.

Figure 3:
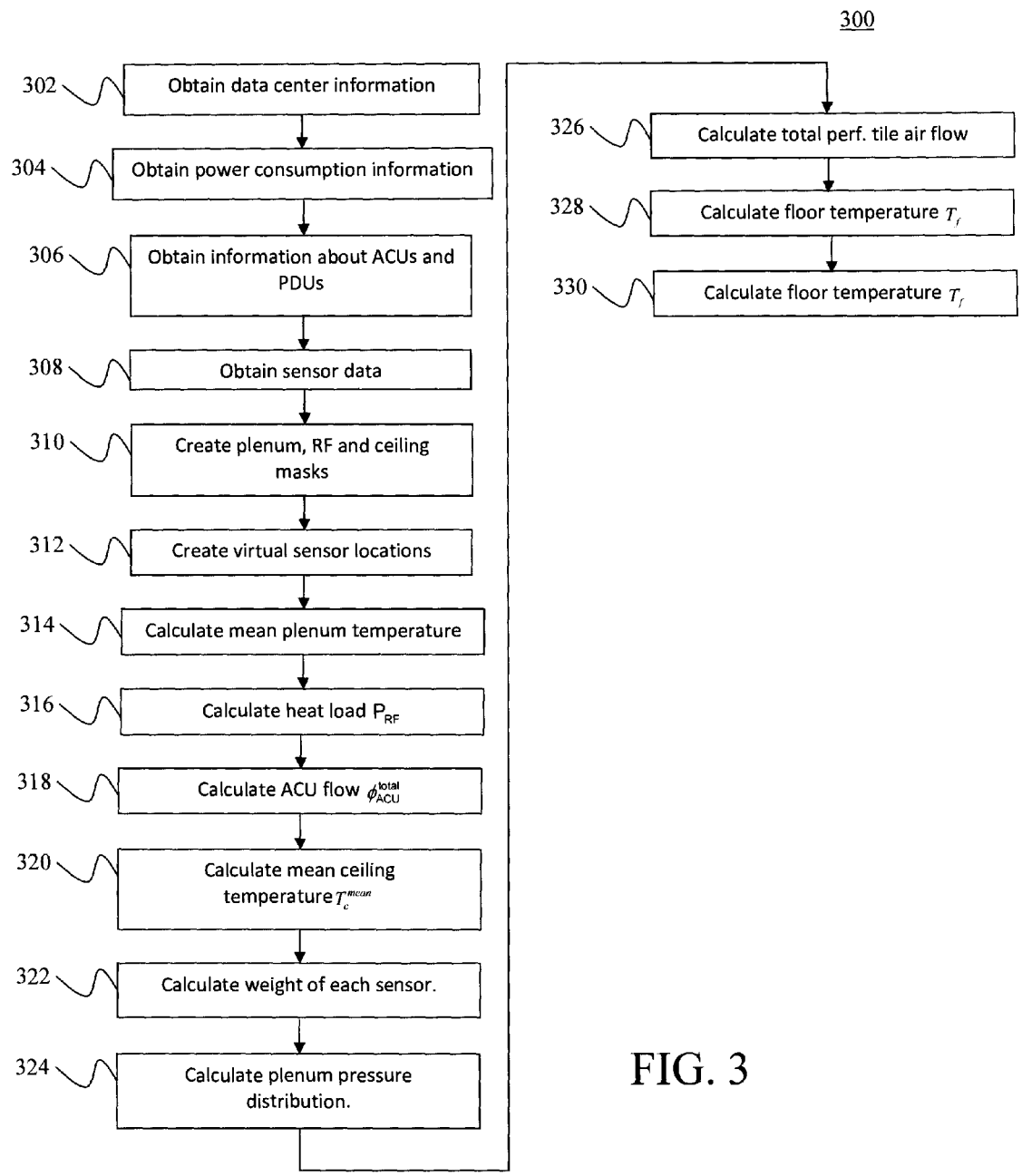
FIG. 3 is a diagram illustrating an exemplary methodology for real-time modeling of heat distributions in an indoor space, such as a data center, according to an embodiment of the present invention.

The present techniques are now described in detail by way of reference to the description of FIG. 3. FIG. 3 is a diagram of an exemplary methodology 300 for real-time modeling of heat distributions in an indoor space, such as a data center.

To begin the process, information is gathered about the data center (DC) and the elements (ACUs, PDUs, CDUs, sensors, perforated tiles, etc.) within the data center. See, for example, steps 302-330 which are now described. According to an exemplary embodiment, in step 302, the area of the data center floor, i.e., floorArea: $A_{DC}$, is determined. The data center floor area can be determined by one of skill in the art given the physical dimensions of the data center. For instance, given the exemplary data center shown in FIG. 1, if the footprint of the floor is a 15 foot by 20 foot rectangle, then the floor area $A_{DC}$ would be 15×20=300 square feet.

Next, in step 304, power consumption data is obtained from the data center. According to an exemplary embodiment, the following power consumption data is obtained:
  power consumption by the data center lighting (e.g., a light power consumption factor [1.5 W/feet$^2$]),
  power consumption by the ACUs (e.g., an ACU overhead factor (about 10 percent (%)),
  power consumption by the PDUs (e.g., a PDU overhead factor (about 10%)),
  power consumption by the CDUs $P_{CDU}$ (e.g., power removed by water cooling [kW])
  miscellaneous power consumption in the data center $P_{misc}$ (e.g., misc power in data center [kW], i.e., power consumption in the data center by equipment in the data center which do not receive power through a PDU—power consumption by equipment in the data center other than the lighting, ACUs, and CDUs which all receive power through a PDU). Power consumption information for each ACU, PDU, CDU, etc. in the data center is generally provided by the equipment manufacturer and thus can be easily determined based on the number of units in operation. The same is true for the data center lighting. Each light bulb/tube has a power consumption rating. Thus, the overall power consumption by the lighting in the data center can be easily determined. Optionally, meters may be employed to measure power consumption at each ACUs, PDUs, CDU, etc. Some energy monitoring systems (such as those available from BTi Energy Management, Calgary, Canada) include remote meter reading and reporting capabilities that are internet enabled and thus data can be easily compiled and reported.

In step 306, the following data is obtained regarding the ACUs and PDUs:
  blowerPower: $P_{blower}^j$ blower power for j th blower [kW or horse power]
  blowerSetting: $\theta_{blower}^j$ blower setting for j th blower
  flowCapacity: $\varphi_{ACU,0}^j$ flow capacity at 100% blower setting for j th blower.
Nominal values (manufacturer specification) for flow capacity may be taken.
  measuredFlow: $\varphi_{ACU,M}^j$ measured flow of j th blower. Measured flow is flow capacity times the blower setting.
  power: $P_{PDU}^i$ power for i th PDU.
The blower motor power for each of the ACUs and the power for each of the PDUs can be determined based on the specifications given by the equipment manufacturer. The blower motor speed setting is generally set by the data center operator.

In step 308, real-time data is obtained from each of the sensors deployed throughout the data center. As provided above, the sensors employed in the data center can include, but are not limited to, inlet and discharge thermal sensors, flow sensors, pressure sensors, and power/current sensors. As will be described in detail below, a weight (i.e., $w^n$ weight of $n^{th}$ sensor) may be applied to each sensor to account for the fact that different sensors are at different heights in the data center. Thus, each sensor is weighted by its distance to the ceiling.

Air flow rates through the perforated tiles in the raised floor depend on the flow resistance (or flow impedance) of the tiles. Thus, the flow impedance for each tile is obtained:
  flowImpedance: $R_{PERF}^q$ perforated tile flow impedance of q th tile [Pa/cfm2].
In most cases, the flow impedance information for a given brand/configuration of perforated tile is known. Alternatively, the flow impedance of a perforated tile can be determined based on the perforation of the tile. For instance, the perforated tile impedance $R_t$ may be given by:

$$R_t = \frac{1}{2} \times \frac{\rho}{A_t^2} \times K,$$

where $A_t$ is the area of the tile and K is a loss coefficient. The loss coefficient can be determined by:

$$K = \frac{1}{o^2}(1 + 0.5 \times (1-o)^{0.75}) + (1.414(1-o)^{0.375}),$$

wherein o is the fractional opening or perforation of the tile. See, for example, Yogendra Joshi and Pramod Kumar (eds.), "Energy Efficient Thermal Management of Data Centers," 2012, DOI: 10.1007/978-1-4419-7124-1, the contents of which are incorporated by reference herein. The perforated tiles in the data center might be fitted with dampers which can be adjusted to regulate air flow. Dampers increase the impedance. Thus, in that case, a very large impedance (e.g., 10 times more impedance) is applied.

As will be described in detail below, a floor temperature distribution in the data center will be determined based on convolution of a plenum temperature distribution and a perforated tile air flow distribution. As is known in the art, convolution is an operation performed on two functions that results in a third function that is a modified version of one of the original functions. With convolution, masks (convolution masks) are applied to the function that 'translate' the function. Convolution masks are commonly used in image filtering to enhance image quality. The convolution masks typically include a matrix of values or weights, which represents the second function.

Figure 4:
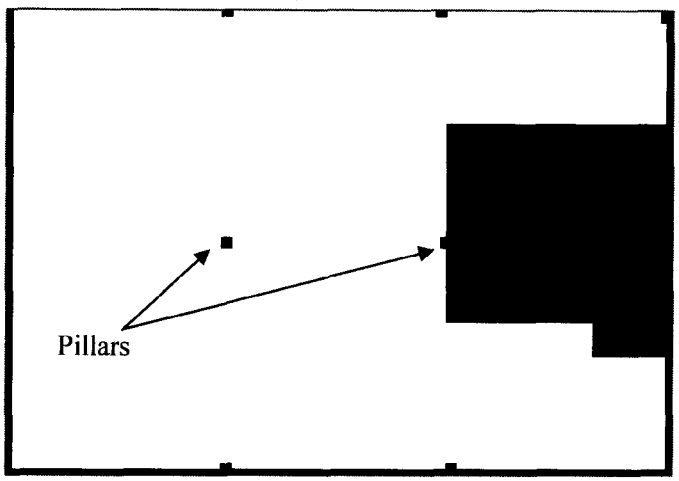
FIG. 4 is a diagram illustrating an exemplary plenum convolution mask according to an embodiment of the present invention.
Figure 5:
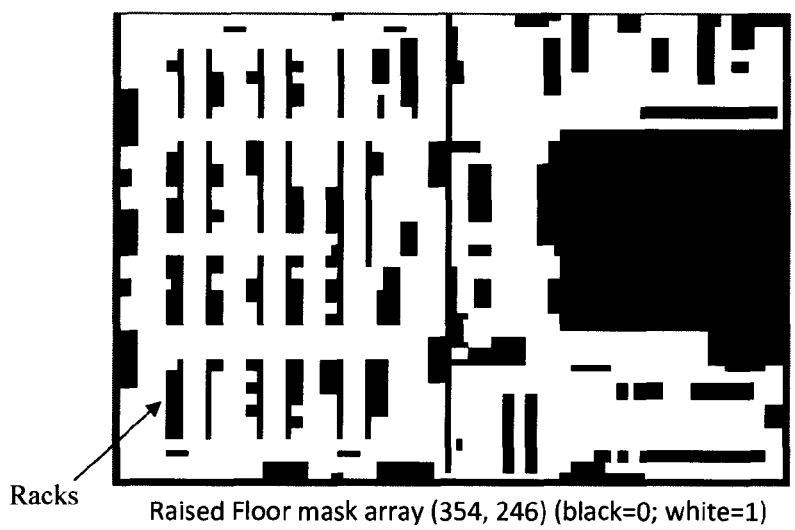
FIG. 5 is a diagram illustrating an exemplary raised floor (RF) convolution mask according to an embodiment of the present invention.
Figure 6:
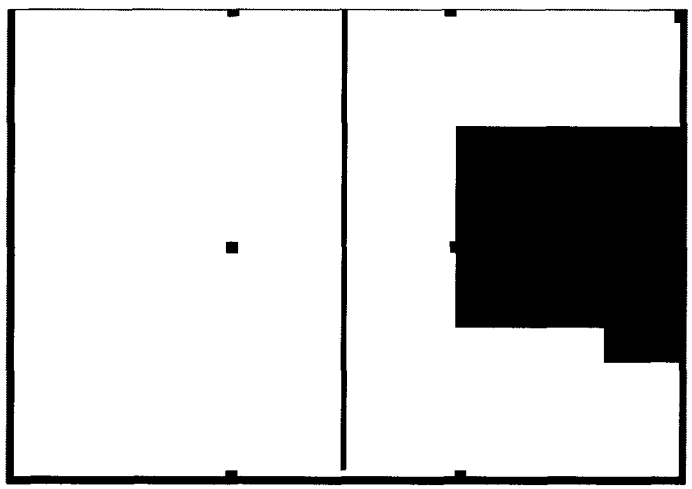
FIG. 6 is a diagram illustrating an exemplary ceiling convolution mask according to an embodiment of the present invention.

Thus, in step 310, plenum, raised floor (RF) and ceiling masks are created. The information needed to create the mask is the data center dimensions and the location/dimensions of all the structures (e.g., pillars), equipment (e.g., racks), furniture etc. in the data center. An exemplary plenum mask is shown in FIG. 4, an exemplary raised floor (RF) mask is shown in FIG. 5 and an exemplary ceiling mask is shown in FIG. 6. Specifically, in the exemplary plenum mask shown in FIG. 4 the white area denotes open space, while the black area denotes portions of the plenum that are blocked off (e.g., see FIG. 4 where area of plenum blocked off by pillars (which support the raised floor) are labeled). Similarly, in the exemplary raised floor mask and ceiling mask shown in FIGS. 5 and 6, respectively, open space is shown in white and areas blocked off, e.g., by equipment such as racks and pillars, are shown in black.

As described above, optionally, virtual sensors may be employed in accordance with the present techniques at the "exhaust"/outlet side of the rack opposite to the inlet thermal sensors. These sensors will also be referred to herein as "virtual (outlet) sensors." This enables one to estimate the exhaust temperatures for each rack. With virtual sensors a knowledge base can be used to "estimate" the difference between inlet and exhaust temperatures. An exemplary virtual sensor framework that may be implemented in accordance with the present techniques is described, for example, in W. Minker et al. (eds.) "Advanced Intelligent Environments," Springer Dordrecht (2009) (hereinafter "Minker"), the contents of which are incorporated by reference herein. For example, in section 3.2, FIG. 2 of Minker a virtual sensor framework architecture is shown which includes a knowledge base and a framework controller. The knowledge base manages information related to the virtual sensors and the framework controller determines which virtual sensors need to be created based on data from the knowledge base.

Figure 7:
FIG. 7 is a diagram illustrating an exemplary equipment index according to an embodiment of the present invention.
Figure 8:
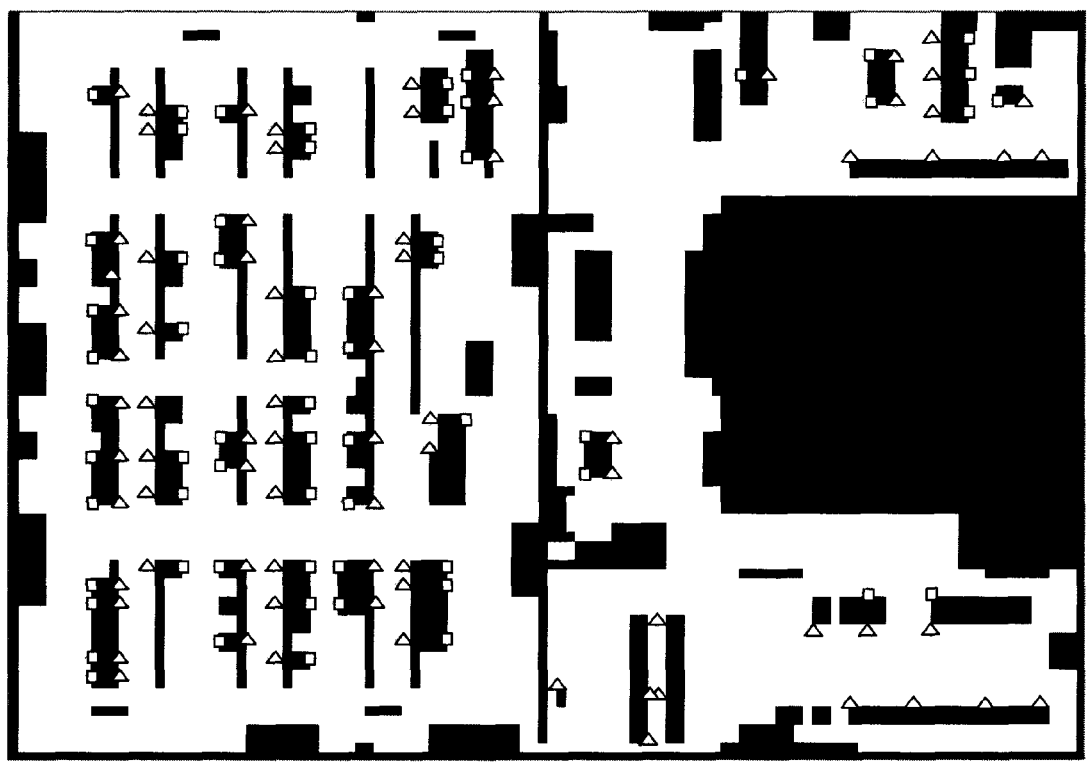
FIG. 8 is a diagram illustrating an exemplary configuration of a data center showing a location of inlet thermal sensors and virtual sensors according to an embodiment of the present invention.

According to the present techniques, in step 312, the placement of the virtual (outlet) sensors (creating virtual sensor locations) will be based on the location of the inlet thermal sensors, see above. Namely, it is preferable to create a virtual (outlet) sensor at the exhaust side of a rack opposite a physical inlet sensor. That way the exhaust temperatures for each rack can be determined. Thus, according to an exemplary embodiment, the first step in creating the virtual (outlet) sensor locations is to create an equipment index. The equipment index is basically a mapping of all of the equipment (e.g., racks) in the data center. See for example FIG. 7 which shows an exemplary equipment index. In the equipment index shown in FIG. 7, the black areas denote areas of the data center which have no equipment (i.e., zero equipment index). The number code is used to "tag" the equipment. Next, the locations of each of the (physical) inlet thermal sensors are determined. As described, for example, in conjunction with the description of FIG. 1, above, the inlet thermal sensors may be located at the intake side of the racks, at various heights on the racks (see FIG. 1). Using the equipment index and the location of the inlet thermal sensors (at the intake side of the racks), virtual (outlet) sensors can simply be created at the corresponding exhaust side of the racks (opposite the inlet thermal sensors). Thus, in one exemplary configuration, for each inlet thermal sensor on a rack in the data center, there is a corresponding virtual (outlet) sensor. See, for example, FIG. 8 which is an exemplary configuration of a data center, where inlet thermal sensor locations are represented by triangles and virtual (outlet) sensor locations are represented by squares.

The real-time data collected from the physical sensors (see description of step 308, above) may or may not be consistent with the model description of a sensor. For example, MMT has a data model which has data for every sensor like its location, its type and other description. It is possible that someone physically puts in a sensor but forgets to update the data model. In the case of inconsistencies, sensor filtering may be performed. For instance, some sensors may be unbound meaning that a real-time value is obtained for a sensor but a corresponding sensor description is not found in the data model. For example, it may be unknown what type of sensor it is and where it is located.

Another inconsistency that might occur is when a sensor(s), for which there is an entry in the data model, may not transmit a real-time value. By way of example only, this might occur because the sensor may be faulty, someone might have removed it or disconnected its power/battery, a network/IT issue may have occurred. Such sensors are classified as "missing." A further distinction may be made herein between those "missing" sensors which are permanently missing (i.e., those sensors which provide no value at all) and those that are temporarily missing (i.e., sensors which provide data but after a specified time out period has ended). These sensors which provide data but after a specified time out period has ended are also referred to herein as "out of time sensors," or "timed out" sensors and as indicated immediately above are considered temporarily missing.

Yet another inconsistency is with regard to sensors which are out of range. This can be caused by "bit errors," which can yield non-physical values. These "out of range" sensors can be identified by specifying an expected range, and their values can be removed from consideration.

It is notable that, as described above, power consumption by the PDUs can be determined by monitoring power values from each PDU. Alternatively, current values may be monitored for each of three inputs (I) of a PDU (i.e., three phase units will have three values for current). These current values can then be used to determine the power consumption associated with this particular PDU using:

$$P_{PDU}{}^j=(I_1{}^i+I_2{}^i+I_3{}^i)/3\cdot 208 V\sqrt{3}\cdot PF,$$

where PF is the power factor (PF~0.9).

Taking the above-described sensor inconsistencies into account, the number (#) of real-time sensors (RTS) (i.e., sensors for which real-time values are present) is specified based on the number of model sensors (MS), the number of unbound sensors (see above) and the number of missing sensors (see above) as follows:

$$\#RTS=\#MS+\#unbound-\#missing.$$

Figures 9, 10:
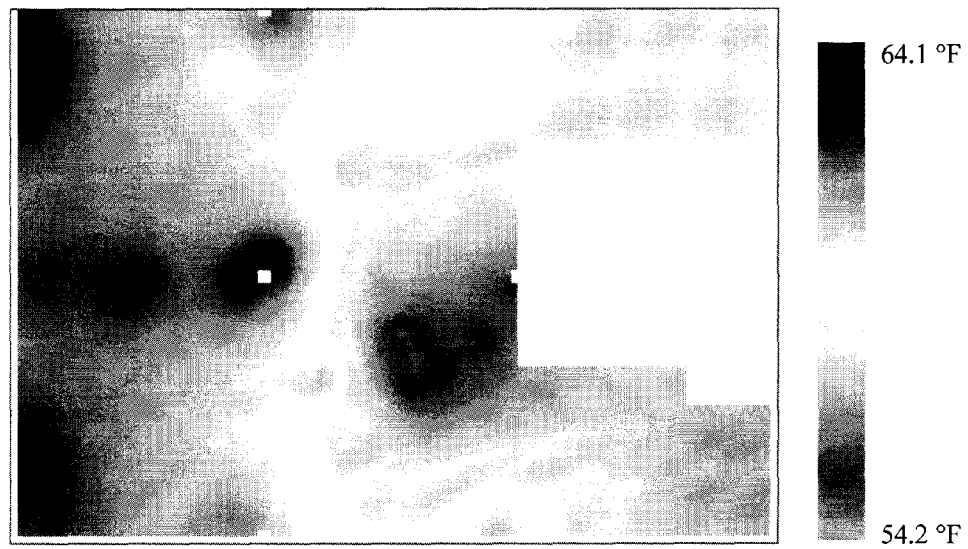
FIG. 9 is a diagram illustrating an exemplary sensor table according to an embodiment of the present invention.
FIG. 10 is a diagram illustrating an exemplary plenum temperature array according to an embodiment of the present invention.

The model sensors (MS) are those sensors which are specified in the model. See for example FIG. 8 which, as described above, shows the locations of physical and virtual sensors in the data center. Model sensors include only physical sensors. The present process generates virtual sensors internally for creating heat maps. Unbound sensors would have no corresponding entry in the data model, whereas missing sensors would have an entry in the data model but no real-time values. According to an exemplary embodiment, a table can be created of the model sensors, highlighting those sensors which are out of time (temporarily missing sensors, see above) and those which are out of range. As provided above, those sensors which are out of time and out of range are removed from consideration. Based on the table created, the number of remaining sensors can be determined. An exemplary sensor table is shown in FIG. 9, which is set up for each of the three types of sensors (thermal sensors, pressure sensors and flow sensors) used in the present example.

Given the data collected from the sensors, in step 314, the mean plenum temperature $T_p^{mean}$ is calculated. According to an exemplary embodiment, the mean plenum temperature $T_p^{mean}$ is calculated by first using inverse weighted distance (IWD) to determine a plenum temperature distribution $T_p(x, y)$ based on the plenum temperature sensor readings. The plenum temperature readings can be taken from the thermal sensors (discharge) and/or from the plenum thermal sensors, if available (see description of FIG. 1, above). IWD is a commonly employed technique for interpolation using a known scattered set of points (in this case the plenum temperature data). IWD is used to create a distribution (function of x and y) from discrete values. An exemplary plenum temperature distribution/array is shown in FIG. 10. A key shown to the right of the distribution in FIG. 10 shows temperature values ranging from 54.2 degrees Fahrenheit (° F.) to 64.1° F.

The plenum temperature distribution (See FIG. 6) is essentially an array (or grid) of regularly spaced data (temperature) points. The plenum mask (created in step 310, described above) is then applied to the plenum temperature distribution array. Essentially, the mask tells if a point in the array/grid is occupied by a structure or equipment (in this case a pillar) or is free (unoccupied). By applying the plenum mask, the mean plenum temperature $T_p^{mean}$ is then calculated. The plenum mask is used to eliminate all points occupied by equipment, etc. before calculating the mean temperature. As will be described in detail below, the mean plenum temperature $T_p^{mean}$ will be used to calculate the ceiling temperature.

Another factor needed to calculate the ceiling temperature is the heat load in the data center. Thus, in step 316, the heat load in the data center (also referred to herein as the raised floor or RF) $P_{RF}$ is calculated. This heat load $P_{RF}$ calculation takes into account the power consumption of the PDUs $P_{PDU}^i$, the data center floor area $A_{DC}$, the blower power $P_{blower}^j$ and blower settings $\theta_{blower}^j$, miscellaneous power consumption $P_{misc}$ and power consumption by the CDUs $P_{CDU}$ (all of which were obtained as described above) as follows:

$$P_{RF} = \sum_{i=1}^{\#ofPDUs} P_{PDU}^i + pdu \cdot \sum_{i=1}^{\#ofPDUs} P_{PDU}^i + light \cdot A_{DC} +$$
$$\sum_{j=1}^{\#ofACUs} P_{blower}^j \cdot \vartheta_{blower}^{j3} + acu \cdot \sum_{j=1}^{\#ofACUs} P_{blower}^j \cdot \vartheta_{blower}^{j3} + P_{misc} - P_{CDU}$$

Yet another factor needed to calculate the ceiling temperature is the ACU air flow in the data center (i.e., the air flow in the data center attributable to the ACUs/blowers). Thus, in step 318, the ACU air flow $\varphi_{ACU}^{total}$ in the data center is calculated. This ACU air flow $\varphi_{ACU}^{total}$ calculation takes into account the flow capacity of the ACUs $\varphi_{ACU,0}^j$ and the blower settings $\theta_{blower}^j$ as follows:

$$\phi_{ACU}^{total} = \sum_{j}^{\#ofACUs} \phi_{ACU}^j \cdot \vartheta_{blower}^j$$

From the mean plenum temperature $T_p^{mean}$ (calculated in step 314), heat load in the data center $P_{RF}$ (calculated in step 316) and the ACU air flow $\varphi_{ACU}^{total}$ in the data center (calculated in step 318), the mean ceiling temperature $T_c^{mean}$ can be calculated in step 320 as follows:

$$T_c^{mean} = 3140 \; [cfm \cdot F/kW] \cdot P_{RF}/\varphi_{ACU}^{total} + T_p^{mean}.$$

Figure 11A:
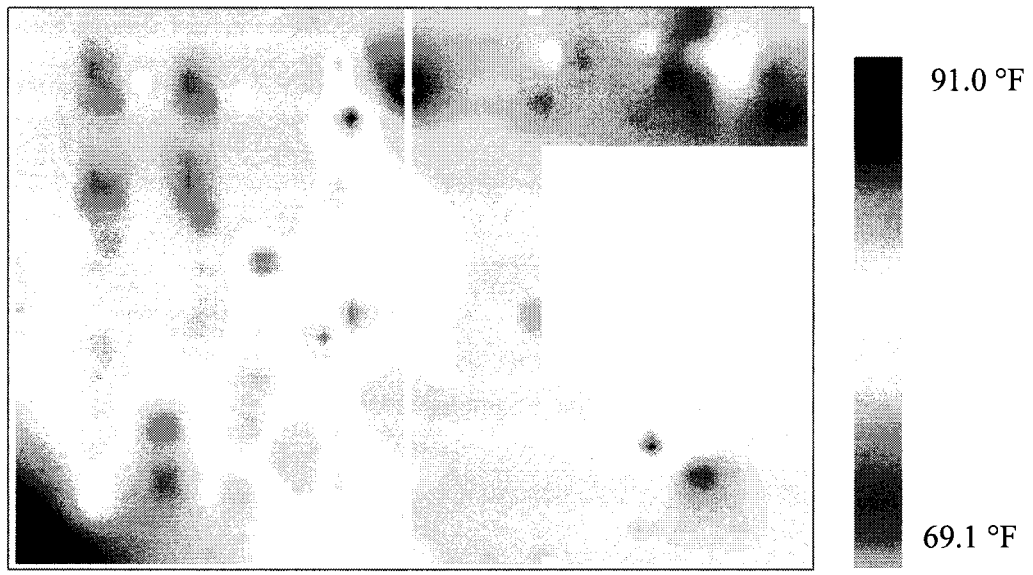
FIG. 11A is a diagram illustrating an exemplary ceiling temperature array with a damping constant of 4 according to an embodiment of the present invention.
Figure 11B:
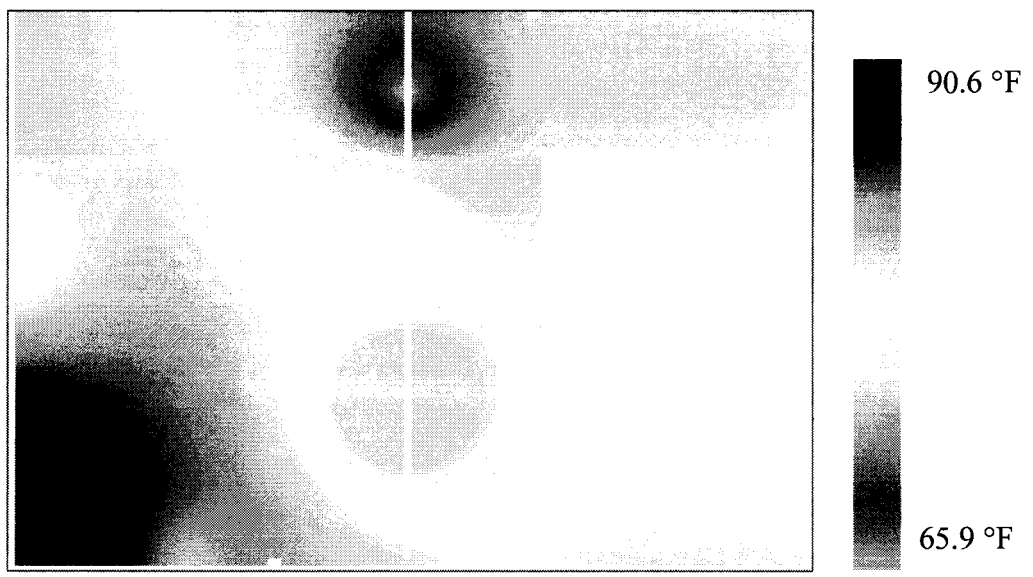
FIG. 11B is a diagram illustrating an exemplary ceiling temperature array with a damping constant of 0.1 according to an embodiment of the present invention.

While so far only the mean ceiling temperature has been determined, a more detailed ceiling temperature distribution is next calculated by leveraging the inlet thermal sensors distributed at one or more of the inlets of each rack measured using the physical and virtual sensors. The mean ceiling temperature is calculated based on energy balance and it is important to know this number because the methodology aims to preserve energy balance. The detailed ceiling temperature distribution is "scaled" such that its mean is the same as the calculated mean ceiling temperature. Specifically, in step 322, a weight of each sensor is calculated. As described above, in order to account for the fact that the different sensors are at different heights in the data center (based, for example, on the placement of the sensor on the rack) and thus influence the ceiling temperature to a greater or lesser extent, each thermal sensor (inlet) and virtual (outlet) sensor is weighted by its distance from the ceiling. The dependence is accomplished with a damping constant k. According to an exemplary embodiment, the weight of each sensor n is calculated as follows:

$$w_{RF}^n = exp(-(dz - z_{RF}^n)/k),$$

with k being the damping constant. Exemplary ceiling temperature distributions are shown in FIGS. 11A and 11B (described below) which employ different damping constants.

Based on the inlet thermal sensor readings, IWD is used to calculate a ceiling temperature distribution $T_c(x,y)$. Sensor weights are used in IWD. In this case the weight is w_rf/distance. IWD was described above. Exemplary ceiling temperature distribution/array are shown in FIGS. 11A and 11B. The ceiling temperature distribution array in FIG. 11A applies a damping constant k of 4 and the ceiling temperature distribution array in FIG. 11B applies a damping constant k of 0.1. According to an exemplary embodiment, the particular damping constant value is determined based on trial and error to give a good fit to the MMT cart data. A key shown to the right of the distribution in FIG. 11A shows temperature values ranging from 69.1° F. to 91.0° F. A key shown to the right of the distribution in FIG. 11B shows temperature values ranging from 65.9° F. to 90.6° F.

The ceiling temperature distribution (see FIG. 11A or 11B) is essentially an array (or grid) of regularly spaced data (temperature) points. The ceiling mask (created in step 310, described above) is then applied to the ceiling temperature distribution array. Essentially, the mask tells if a point in the array/grid is occupied by a structure or equipment (in this case a pillar) or is free (unoccupied). Once the ceiling temperature distribution has been estimated, the mean value of that distribution is adjusted (normalized) so that it obeys the principle of energy balance as previously established to yield the correct (based on energy balance) average ceiling temperature. The energy balance here makes sure that the mean temperature rise in the data center is consistent with the amount of heat dissipated by IT equipment, etc. The mean temperature calculated using sensor values in general will not be equal to the mean temperature calculated using energy balance. So the whole temperature distribution calculated using sensor values is scaled so that its mean is the same as that calculated using energy balance.

Figure 12:
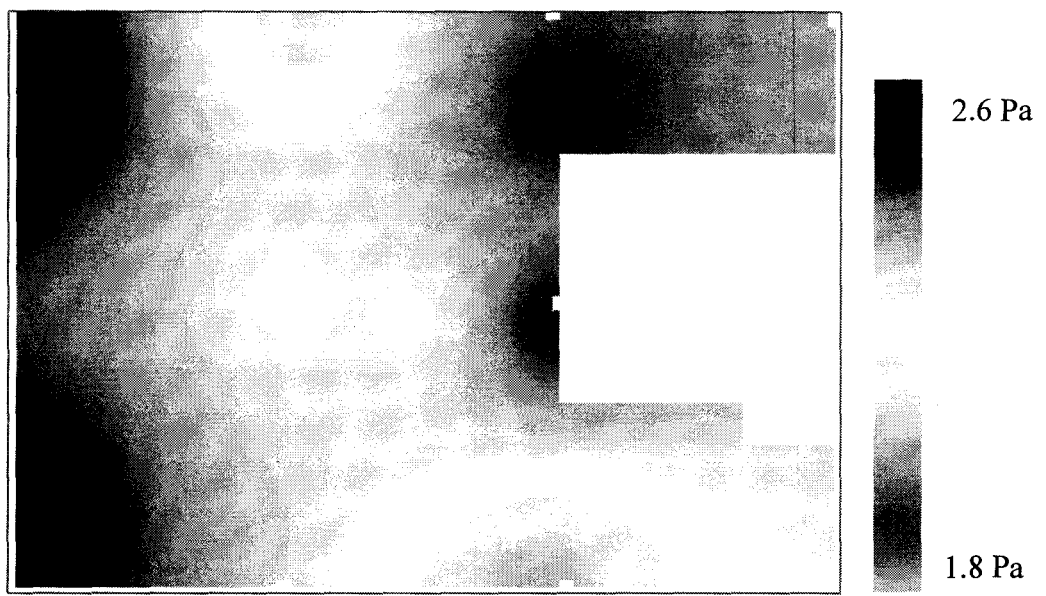
FIG. 12 is a diagram illustrating an exemplary plenum pressure array according to an embodiment of the present invention.

Next, the floor temperature distribution is determined. In order to do so, the air flow through each perforated tile is first calculated using the tile impedance of each tile and the pressure differential at the tile location. According to an exemplary embodiment, in step 324, based on the plenum pressure sensor readings (obtained, e.g., in step 308, see above), IWD is used to calculate the plenum pressure distribution $P_P(x,y)$. As provided above, IWD is a standard interpolation technique. An exemplary plenum pressure distribution/array is shown in FIG. 12. A key shown to the right of the distribution in FIG. 12 shows pressure values ranging from 1.8 Pascal (Pa) to 2.6 Pa.

The plenum pressure distribution (See FIG. 12) is essentially an array (or grid) of regularly spaced data (pressure) points. The plenum mask (created in step 310, described above) is then applied to the plenum pressure distribution array. Essentially, the mask tells if a point in the array/grid is occupied by a structure or equipment (in this case a pillar) or is free (unoccupied).

Next, the plenum pressure $P_p$ is used to calculate the perforated air flow from each tile $\varphi_{PERF}^q$ as follows:

$$\varphi_{PERF}^q = \sqrt{P_p(x_{PERF}^q, y_{PERF}^q)/R_{PERF}^q}.$$

Using the perforated air flow from each tile $\varphi_{PERF}^q$, in step 326, the total perforated tile air flow $\varphi_{PERF}^{total}$ can be calculated as follows:

$$\phi_{PERF}^{total} = \sum_q \phi_{PERF}^q.$$

Figure 13:
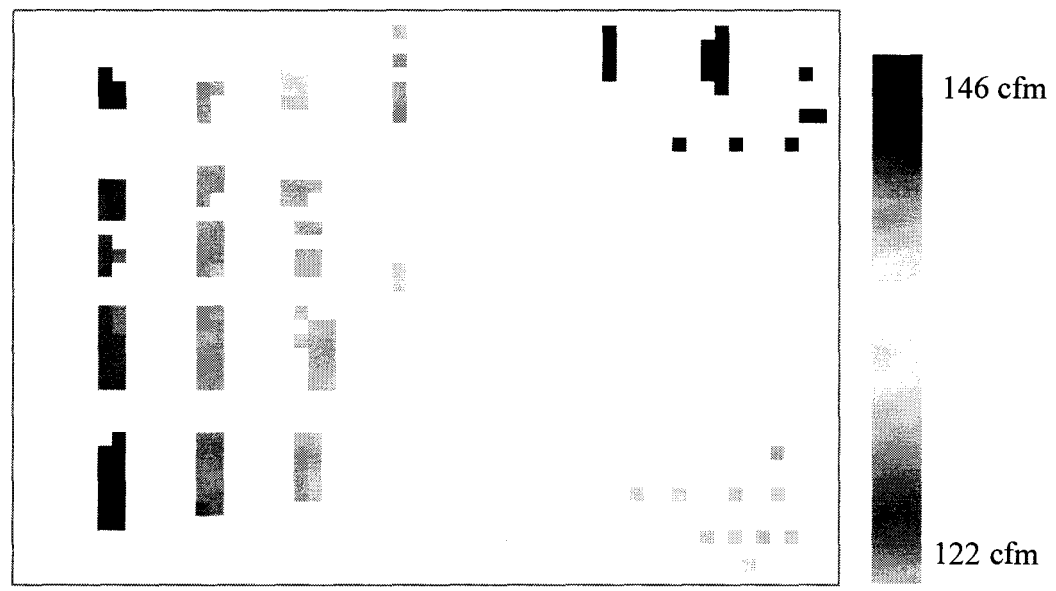
FIG. 13 is a diagram illustrating the flow rate of air in cubic feet per minute (cfm) coming out of each tile according to an embodiment of the present invention.

FIG. 13 is a diagram illustrating the flow rate of air in cubic feet per minute (cfm) coming out of each tile. A key shown to the right of the distribution in FIG. 13 shows air flow values ranging from 122 cfm to 146 cfm. Where there is no tile the value is zero.

Figure 14:
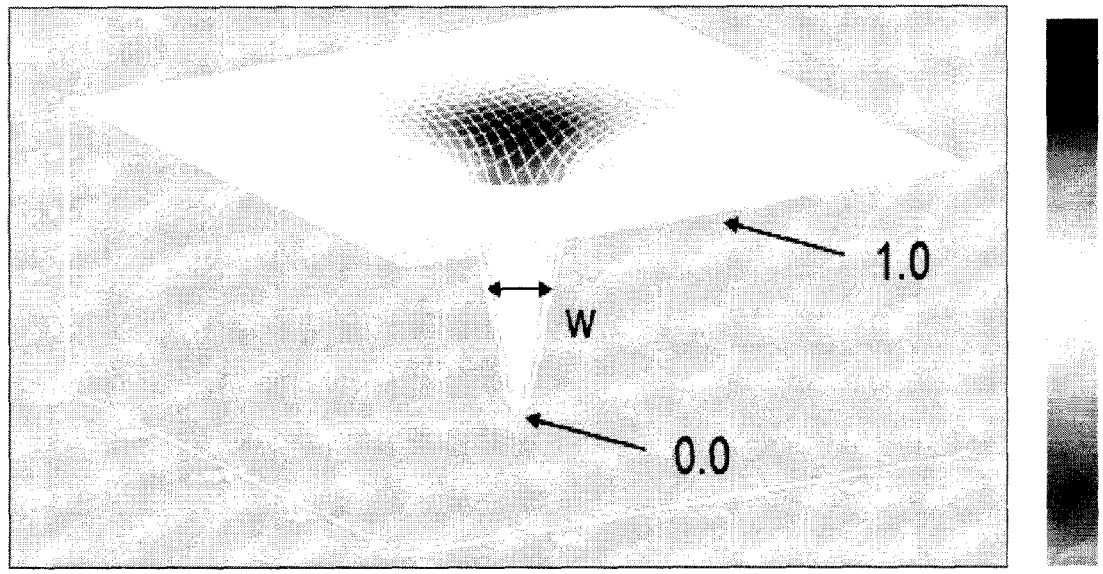
FIG. 14 is a diagram illustrating an exemplary response function matrix according to an embodiment of the present invention.

Next, in step 328, the floor temperature $T_f$ is calculated. In order to calculate the floor temperature $T_f$, a normalized Lorentzian field (resp) is applied to each tile location as follows:

$$z^q = \sqrt{(x-x_{PERF}^q)^2 + (y-y_{PERF}^q)^2}$$

$$resp^q(x, y) = \frac{-1}{w} \cdot \frac{w}{z^{q^2} + w^2} + 1,$$

which takes into account the air flow through each perforated tile, which was calculated as described above. The Lorentzian field is chosen to yield 0 at the center of the tile and converge to 1 at large distances from the tile. By way of example only, as described in conjunction with the description of FIG. 14 below, the half point of the response function is at the tile edges. So at 2 to 3 tiles away (about 4 feet to about 6 feet) the value of the Lorentzian field will be close to 1. The width of the Lorentzian field can be a function of the air flow where larger flows could result in a slower convergence to 1 with distance (wider fields, more impact). This process is repeated by multiplying the Lorentzian fields at each tile location with the previous fields. The process yields a 2D surface with very low values (close to 0) in the vicinity of tiles and higher values (close to 1) at locations far away from the tiles. An exemplary response function matrix is shown in FIG. 14. A key shown to the right of the distribution in FIG. 14 shows the Lorentzian field values ranging from 0 to 1. Note knowing the "pixel" translation w can be related to a distance with a unit. In this particular example, 1 tile=2 feet corresponds to 6 pixels. If w is set to 6 the half point of the response function is at the tiles' edges. It is also noted that other response functions can be applied—possibly some of which reflect the shape of the tile (usually a square shape).

An average temperature increase distribution in the data center is then calculated, which is given by the difference between ceiling $T_c$ and plenum temperature $T_p$ distributions, which were determined in steps 320 and 314, respectively, described above. This average temperature increase distribution is multiplied by the product of the Lorentzian fields and the plenum temperature distribution is added to it to yield the floor temperature distribution $T_f$ as follows:

$$T_f(x, y) = \left[ \prod_q^{\# \text{ of tiles}} resp^q(x, y) \right] \cdot \Delta T/2 + T_p(x, y)$$

with $$\Delta T/2 = (T_c(x, y) - T_p(x, y))/2$$

The process yields floor temperatures very near to the plenum temperature at locations close to tiles and average temperatures at locations far away from tiles.

An exemplary matrix of $$\prod_q^{\# \text{ of tiles}} resp^q(x, y)$$

with w=10 (1.67 feet) is shown in FIG. 15A and an exemplary matrix of $$\prod_q^{\# \text{ of tiles}} resp^q(x, y)$$

with w=5 (0.83 feet) is shown in FIG. 15B. A key shown to the right of the distribution in FIG. 15A shows values ranging from 0 to 1, and a key shown to the right of the distribution in FIG. 15B shows values also ranging from 0 to 1. As provided above, MMT cart data can be used to fit parameters such as 1) the width of the Lorentzian fields, 2) the temperature increase across the rack inlet and exhaust and 3) a damping parameter, with the goal being to optimize/fine-tune the process by finding the parameters that give the best fit to the data obtained from the MMT cart. Thus, the values of the "pixel" translation w given above are merely exemplary and other values can be chosen to better fit the MMT cart data.

The floor temperature distribution $T_f$ (see FIGS. 15A and 15B) is essentially an array (or grid) of regularly spaced data (pressure) points. The raised floor mask (created in step 310, described above) is then applied to the floor temperature distribution array. Essentially, the mask tells if a point in the array/grid is occupied by a structure or equipment (in this case servers, furniture, etc.) or is free (unoccupied).

The corresponding resulting floor temperature distributions after the RF mask has been applied are shown in FIGS. 16A and 16B. Specifically, an exemplary floor temperature distribution with w=10 (1.67 feet) is shown in FIG. 16A and an exemplary floor temperature distribution with w=5 (0.83 feet) is shown in FIG. 16B. A key shown to the right of the distribution in FIG. 16A shows temperature values ranging from 56.6° F. to 67.4° F., and a key shown to the right of the distribution in FIG. 16B shows temperature values ranging from 56.3° F. to 73.1661° F.

Finally, in step 330, from the ceiling and floor temperature distributions, a three dimensional temperature distribution for the (e.g., data center) room (also referred to herein as a raised floor temperature distribution) is obtained by interpolating between these values using different approaches. One approach includes using an s-curve. S-curves are described, for example, in U.S. patent application Ser. No. 12/540,213 filed by Hamann et al., entitled "Knowledge-Based Models for Data Centers," the contents of which are incorporated by reference herein. Alternatively, a simple linear interpolation between the floor and the ceiling temperature may be employed. Linear interpolation is a standard method known to those of skill in the art and thus is not described further herein.

Exemplary resulting raised floor temperature distributions are shown in FIGS. 17A and 17B. Specifically, an exemplary raised floor temperature distribution at 4.5 feet above the floor with ΔT=12° C. is shown in FIG. 17A and an exemplary raised floor temperature distribution at 4.5 feet with ΔT=4° C. is shown in FIG. 17B. Height is factored through the linear interpolation or the s-curve interpolation. Basically, for a given height the distribution is obtained by interpolating between the floor temperature distribution and the ceiling temperature distribution. A key shown to the right of the distribution in FIG. 17A shows temperature values ranging from 65.6° F. to 82.4° F., and a key shown to the right of the distribution in FIG. 17B shows temperature values ranging from 67.2° F. to 78.9° F.

Turning now to FIG. 18, a block diagram is shown of an apparatus 1800 for creating a three-dimensional temperature distribution model for a room (such as data center 100) having a floor and a ceiling, in accordance with one embodiment of the present invention. It should be understood that apparatus 1800 represents one embodiment for implementing methodology 300 of FIG. 3, described above.

Apparatus 1800 includes a computer system 1810 and removable media 1850. Computer system 1810 includes a processor device 1820, a network interface 1825, a memory 1830, a media interface 1835 and an optional display 1840. Network interface 1825 allows computer system 1810 to connect to a network, while media interface 1835 allows computer system 1810 to interact with media, such as a hard drive or removable media 1850.

As is known in the art, the methods and apparatus discussed herein may be distributed as an article of manufacture that itself includes a machine-readable medium containing one or more programs which when executed implement embodiments of the present invention. For instance, the machine-readable medium may contain a program configured to determine a ceiling temperature distribution in the room; determine a floor temperature distribution in the room; and interpolate between the ceiling temperature distribution and the floor temperature distribution to obtain the three-dimensional temperature distribution model for the room.

The machine-readable medium may be a recordable medium (e.g., floppy disks, hard drive, optical disks such as removable media 1850, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1820 can be configured to implement the methods, steps, and functions disclosed herein. The memory 1830 could be distributed or local and the processor device 1820 could be distributed or singular. The memory 1830 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1820. With this definition, information on a network, accessible through network interface 1825, is still within memory 1830 because the processor device 1820 can retrieve the information from the network. It should be noted that each distributed processor that makes up processor device 1820 generally contains its own addressable memory space. It should also be noted that some or all of computer system 1810 can be incorporated into an application-specific or general-use integrated circuit.

Optional video display 1840 is any type of video display suitable for interacting with a human user of apparatus 1800. Generally, video display 1840 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for creating a three-dimensional temperature distribution model for a room having a floor and a ceiling, the method comprising the steps of:
    determining an energy balance in the room based on total heat input into the room and total heat extracted from the room;
    calculating a mean temperature proximal to the ceiling using the energy balance to ensure that the mean temperature is consistent with a heat load in the room;
    obtaining streaming real-time sensor data from a network of sensors located in the room, wherein the network of sensors comprises real-time power sensors, real-time pressure sensors, real-time air flow sensors, and real-time thermal sensors;
    weighting the streaming real-time sensor data obtained from each of the real-time thermal sensors by a distance of each of the real-time thermal sensors from the ceiling to account for the real-time thermal sensors being at different heights in the room;
    determining a first two-dimensional temperature distribution in the room proximal to the ceiling using the streaming real-time sensor data from a first set of the network of sensors;
    scaling the first two-dimensional temperature distribution such that a mean of the first two-dimensional temperature distribution is equal to the mean temperature calculated using the energy balance thereby preserving the energy balance between the heat load in the room and temperature measured using the network of sensors;

determining a second two-dimensional temperature distribution in the room proximal to the floor using the streaming real-time sensor data from a second set of the network of sensors different from the first set; and interpolating between the first two-dimensional temperature distribution and the second two-dimensional temperature distribution to obtain the three-dimensional temperature distribution model for the room which conforms to a principle of energy balance, wherein the room is a data center having a sub-floor plenum beneath the floor and wherein the three-dimensional temperature distribution model is used to implement cooling within the data center in a manner that improves energy efficiency.

2. The method of claim 1, wherein cooled air is provided to the data center through the sub-floor plenum by way of perforated tiles in the floor.

3. The method of claim 2, further comprising the step of:
obtaining power consumption data from equipment in the data center.

4. The method of claim 3, wherein the power consumption data comprises data from power distribution units in the data center, the equipment in the data center which receive power through the power distribution units and the equipment in the data center which do not receive power through the power distribution units.

5. The method of claim 4, wherein the equipment in the data center which receive power through the power distribution units comprise lighting in the data center, air conditioning units in the data center and coolant distribution units in the data center.

6. The method of claim 5, wherein the air conditioning units in the data center each comprise a blower motor to circulate air through the air conditioning unit and to blow cooled air into the sub-floor plenum, the method further comprising the step of:
obtaining one or more of power data, blower setting data and air flow data for blower motors.

7. The method of claim 5, wherein the data center further comprises a plurality of equipment racks, each of the equipment racks having an air inlet side and an air outlet side, the method further comprising the steps of:
obtaining real-time inlet air temperature data from one or more of the air inlet sides of the equipment racks;
obtaining real-time discharge air temperature data from one or more of the air conditioning units;
obtaining real-time discharge air flow data from one or more of the air conditioning units; and
obtaining real-time sub-floor plenum pressure data from the sub-floor plenum.

8. The method of claim 7, wherein the real-time inlet air temperature data from one or more of the air inlet sides of the equipment racks and the real-time discharge air temperature data from one or more of the air conditioning units are obtained using the real-time thermal sensors.

9. The method of claim 7, wherein the real-time discharge air flow data from one or more of the air conditioning units is obtained using the real-time air flow sensors.

10. The method of claim 7, wherein the real-time sub-floor plenum pressure data from the sub-floor plenum is obtained using the real-time pressure sensors.

11. The method of claim 7, further comprising the step of:
obtaining real-time outlet air temperature data from one or more of the air outlet sides of the equipment racks using virtual sensors.

12. The method of claim 7, wherein the real-time inlet air temperature data from one or more of the air inlet sides of the equipment racks is used to determine the ceiling temperature distribution.

13. The method of claim 7, further comprising the step of:
calculating a sub-floor plenum pressure distribution based on an inverse weighted distance of the real-time sub-floor plenum pressure data from the sub-floor plenum;
using the sub-floor plenum pressure distribution to determine air flow from each of the perforated tiles in the floor; and
using the air flow from each of the perforated tiles in the floor and an average temperature increase distribution in the data center to determine the floor temperature distribution.

14. The method of claim 13, further comprising the step of:
applying a normalized Lorentzian field to each of the perforated tiles in the floor.

15. The method of claim 2, further comprising the step of:
creating a convolution mask for the sub-floor plenum which indicates what portions of the sub-floor plenum comprise open space and what portions of the sub-floor plenum are blocked off.

16. The method of claim 15, further comprising the step of:
obtaining real-time sub-floor plenum temperature data from the sub-floor plenum;
using the real-time sub-floor plenum temperature data to calculate a sub-floor plenum temperature distribution; and
applying the convolution mask for the sub-floor plenum to the sub-floor plenum temperature distribution to determine a mean sub-floor plenum temperature.

17. The method of claim 16, wherein the sub-floor plenum temperature distribution is calculated based on the inverse weighted distance of the real-time sub-floor plenum temperature data.

18. The method of claim 16, further comprising the step of:
using the mean sub-floor plenum temperature to determine a mean ceiling temperature based on a heat load in the data center and a total air flow in the data center attributable to the air conditioning units.

19. The method of claim 1, further comprising the steps of:
creating a convolution mask for the room which indicates what portions of the room comprise open space and what portions of the room are blocked off; and
creating a convolution mask for the ceiling which indicates what portions of the ceiling comprise open space and what portions of the ceiling are blocked off.

20. An apparatus for creating a three-dimensional temperature distribution model for a room having a floor and a ceiling, the apparatus comprising:
a memory; and
at least one processor device, coupled to the memory, operative to:
determine an energy balance in the room based on total heat input into the room and total heat extracted from the room;

calculate a mean temperature proximal to the ceiling using the energy balance to ensure that the mean temperature is consistent with a heat load in the room;

obtain streaming real-time sensor data from a network of sensors located in the room, wherein the network of sensors comprises real-time power sensors, real-time pressure sensors, real-time air flow sensors, and real-time thermal sensors;

weight the streaming real-time sensor data obtained from each of the real-time thermal sensors by a distance of each of the real-time thermal sensors from the ceiling to account for the real-time thermal sensors being at different heights in the room;

determine a first two-dimensional temperature distribution in the room proximal to the ceiling using the streaming real-time sensor data from a first set of the network of sensors;

scale the first two-dimensional temperature distribution such that a mean of the first two-dimensional temperature distribution is equal to the mean temperature calculated using the energy balance thereby preserving the energy balance between the heat load in the room and temperature measured using the network of sensors;

determine a second two-dimensional temperature distribution in the room proximal to the floor using the streaming real-time sensor data from a second set of the network of sensors different from the first set; and interpolate between the first two-dimensional temperature distribution and the second two-dimensional temperature distribution to obtain the three-dimensional temperature distribution model for the room which conforms to a principle of energy balance, wherein the room is a data center having a sub-floor plenum beneath the floor and wherein the three-dimensional temperature distribution model is used to implement cooling within the data center in a manner that improves energy efficiency.

21. The apparatus of claim 20, wherein cooled air is provided to the data center through the sub-floor plenum by way of perforated tiles in the floor.

22. A non-transitory article of manufacture for creating a three-dimensional temperature distribution model for a room having a floor and a ceiling, comprising a machine-readable medium containing one or more programs which when executed implement the steps of:

determining an energy balance in the room based on total heat input into the room and total heat extracted from the room;

calculating a mean temperature proximal to the ceiling using the energy balance to ensure that the mean temperature is consistent with a heat load in the room;

obtaining streaming real-time sensor data from a network of sensors located in the room, wherein the network of sensors comprises real-time power sensors, real-time pressure sensors, real-time air flow sensors, and real-time thermal sensors;

weighting the streaming real-time sensor data obtained from each of the real-time thermal sensors by a distance of each of the real-time thermal sensors from the ceiling to account for the real-time thermal sensors being at different heights in the room;

determining a first two-dimensional temperature distribution in the room proximal to the ceiling using the streaming real-time sensor data from a first set of the network of sensors;

scaling the first two-dimensional temperature distribution such that a mean of the first two-dimensional temperature distribution is equal to the mean temperature calculated using the energy balance thereby preserving the energy balance between the heat load in the room and temperature measured using the network of sensors;

determining a second two-dimensional temperature distribution in the room proximal to the floor using the streaming real-time sensor data from a second set of the network of sensors different from the first set; and interpolating between the first two-dimensional temperature distribution and the second two-dimensional temperature distribution to obtain the three-dimensional temperature distribution model for the room which conforms to a principle of energy balance, wherein the room is a data center having a sub-floor plenum beneath the floor and wherein the three-dimensional temperature distribution model is used to implement cooling within the data center in a manner that improves energy efficiency.

23. The article of manufacture of claim 22, wherein cooled air is provided to the data center through the sub-floor plenum by way of perforated tiles in the floor.

* * * * *